(12) United States Patent
Koga

(10) Patent No.: US 9,291,143 B2
(45) Date of Patent: Mar. 22, 2016

(54) SPARK IGNITION INTERNAL COMBUSTION ENGINE AND CONTROL METHOD OF SPARK IGNITION INTERNAL COMBUSTION ENGINE

(75) Inventor: Masaki Koga, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 15 days.

(21) Appl. No.: 14/353,642

(22) PCT Filed: Sep. 10, 2012

(86) PCT No.: PCT/JP2012/073044
§ 371 (c)(1),
(2), (4) Date: Apr. 23, 2014

(87) PCT Pub. No.: WO2013/061697
PCT Pub. Date: May 2, 2013

(65) Prior Publication Data
US 2014/0298777 A1  Oct. 9, 2014

(30) Foreign Application Priority Data
Oct. 24, 2011 (JP) .................. 2011-232678

(51) Int. Cl.
*F01N 3/00* (2006.01)
*F02M 25/06* (2006.01)
*F02P 5/145* (2006.01)
*F02D 41/14* (2006.01)
(Continued)

(52) U.S. Cl.
CPC ................ *F02P 5/145* (2013.01); *F02D 21/08* (2013.01); *F02D 41/005* (2013.01);
(Continued)

(58) Field of Classification Search
CPC ............ F02D 21/08; F02D 2200/0811; F02D 2250/36; F02D 41/005; F02D 41/1462; F02M 25/07; F02M 25/0715; F02P 5/145; F02P 5/151; F02P 5/1516; Y02T 10/46
USPC ........................... 60/276, 278, 285, 297, 301
See application file for complete search history.

(56) References Cited

U.S. PATENT DOCUMENTS 6,279,537 B1    8/2001  Yonekura et al.
6,327,849 B1 *  12/2001  Sugiura et al. .................. 60/277
(Continued)

FOREIGN PATENT DOCUMENTS

JP    H0763151 A     3/1995
JP    2000-282965 A  10/2000
(Continued)

*Primary Examiner* — Jesse Bogue
*Assistant Examiner* — Diem Tran
(74) *Attorney, Agent, or Firm* — Drinker Biddle & Reath LLP

(57) ABSTRACT

A spark ignition internal combustion engine includes an exhaust gas reflux device capable of refluxing exhaust gas having passed through a catalyst for exhaust gas purification to an intake passage, an ignition timing control means for setting an ignition timing retard amount capable of preventing knocking according to a NOx concentration in the exhaust gas while the exhaust gas is refluxed, a NOx concentration estimation means for estimating the NOx concentration in the exhaust gas, and a purification performance reduction determination means for determining a reduction in purification performance of the catalyst. The ignition timing control means sets the ignition timing retard amount based on the NOx concentration in the exhaust gas before passage through the catalyst if the purification performance reduction determination means determines that the purification performance of the catalyst has been reduced to a state set in advance.

8 Claims, 9 Drawing Sheets

(51) Int. Cl.
  *F02P 5/15* (2006.01)
  *F02P 5/152* (2006.01)
  *F02M 25/07* (2006.01)
  *F02D 21/08* (2006.01)
  *F02D 41/00* (2006.01)
  *F01N 3/10* (2006.01)

(52) U.S. Cl.
  CPC .......... *F02D 41/1462* (2013.01); *F02M 25/07* (2013.01); *F02M 25/0715* (2013.01); *F02P 5/151* (2013.01); *F02P 5/152* (2013.01); *F02P 5/1516* (2013.01); *F01N 3/101* (2013.01); *F02D 2200/0811* (2013.01); *F02D 2250/36* (2013.01); *Y02T 10/46* (2013.01)

(56) References Cited

U.S. PATENT DOCUMENTS

| | | | |
|---|---|---|---|
| 6,637,198 B2 * | 10/2003 | Hertzberg | 60/295 |
| 6,644,021 B2 * | 11/2003 | Okada et al. | 60/286 |
| 7,325,394 B2 * | 2/2008 | Laing et al. | 60/295 |
| 2010/0095933 A1 | 4/2010 | Moriya et al. | |
| 2010/0268442 A1 * | 10/2010 | Kabashima et al. | 701/103 |

FOREIGN PATENT DOCUMENTS

| | | |
|---|---|---|
| JP | 2000-345895 A | 12/2000 |
| JP | 2008-215213 A | 9/2008 |

* cited by examiner

SPARK IGNITION INTERNAL COMBUSTION ENGINE AND CONTROL METHOD OF SPARK IGNITION INTERNAL COMBUSTION ENGINE

TECHNICAL FIELD

The present invention relates to a combustion control to avoid knocking in a spark ignition internal combustion engine.

BACKGROUND ART

One of factors which limit an output of an internal combustion engine is knocking. A control for retarding an ignition timing if knocking occurs or if a state is reached where knocking is likely to occur is known as a means for preventing knocking. Further, exhaust gas recirculation (EGR) for reducing a combustion temperature by refluxing a part of exhaust gas to an intake system and setting an atmosphere, where knocking is unlikely to occur, in a combustion chamber is also known.

Exhaust gas discharged from an internal combustion engine includes NOx, which has a property of making knocking likely to occur. Thus, if the exhaust gas discharged from the internal combustion engine is refluxed to an intake system as it is, a desired knocking preventing effect cannot be achieved or rather knocking may become more likely to occur if a NOx concentration is high.

Accordingly, a configuration for providing a post-treatment device for removing NOx in an EGR passage is disclosed in JP2000-282965A.

SUMMARY OF INVENTION

Although a discharge device is used as the post-treatment device in JP2000-282965A, NOx in exhaust gas can be removed even if an exhaust gas purifying catalyst such as a three-way catalyst is used. However, NOx may remain in the exhaust gas having passed through the post-treatment device regardless of which post-treatment device is used, and NOx has a property of making knocking likely to occur. Thus, a control for retarding an ignition timing according to a NOx concentration in EGR gas is necessary as a measure for preventing knocking caused by remaining NOx.

However, if purification performance of the post-treatment device decreases due to age-related degradation, it leads to a significant increase in the NOx concentration in the exhaust gas after passage through the post-treatment device. Thus, it is difficult to grasp an accurate NOx concentration in the exhaust gas after passage through the post-treatment device.

Therefore, it has been difficult to set an ignition timing retard amount capable of preventing knocking based on a NOx concentration in exhaust gas after passage through the post-treatment device.

An object of the present invention is, therefore, to provide a spark ignition internal combustion engine capable of avoiding knocking even if there is a reduction in performance of a post-treatment device for exhaust gas when EGR is executed.

A spark ignition internal combustion engine according to an embodiment of the present invention includes an exhaust gas reflux device capable of refluxing exhaust gas having passed through a catalyst for exhaust gas purification to an intake passage, and an ignition timing control means for setting an ignition timing retard amount capable of preventing knocking according to a NOx concentration in the intake passage while the exhaust gas is refluxed. The spark ignition internal combustion engine further includes a NOx concentration estimation means for estimating a NOx concentration in the exhaust gas, and a purification performance reduction determination means for determining a reduction in purification performance of the catalyst. The ignition timing control means sets the ignition timing retard amount based on the NOx concentration in the exhaust gas before passage through the catalyst if the purification performance reduction determination means determines that the purification performance of the catalyst has been reduced to a state set in advance.

Embodiments and advantages of the present invention are described in detail below with reference to the accompanying drawings.

BRIEF DESCRIPTION OF DRAWINGS

FIG. 5 is a flow chart for setting an ignition timing retard amount corresponding to purification performance of a catalyst in a third embodiment.

DESCRIPTION OF EMBODIMENTS

First Embodiment

Figure 1:
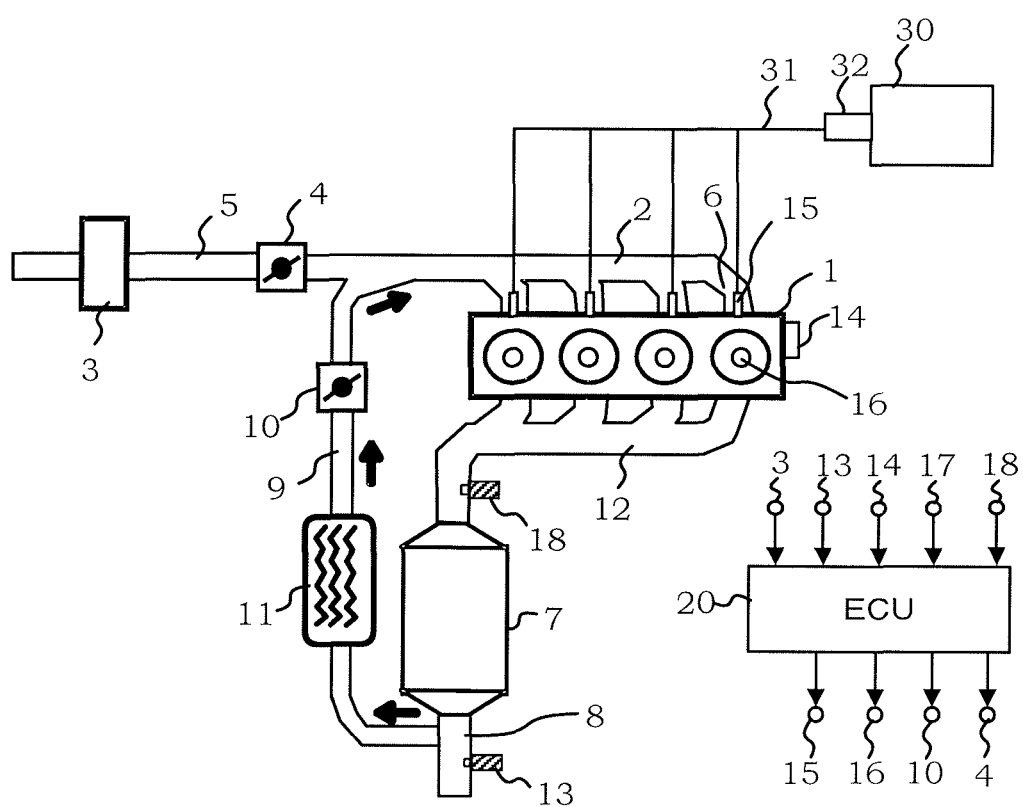
FIG. 1 is a configuration diagram of a system to which a first embodiment of the present invention is applied.

FIG. 1 is a configuration diagram of a system to which a first embodiment of the present invention is applied.

An intake manifold 2 and an exhaust manifold 12 are mounted in an internal combustion engine 1. An intake passage 5 and an EGR pipe 9 (exhaust reflux device) are connected to the intake manifold 2. An exhaust passage 8 is connected to the exhaust manifold 12. An air flow meter 3 for measuring an intake amount and a throttle chamber 4 for regulating the intake amount at a downstream side of the air flow meter 3 are disposed in the intake passage 5.

A three-way catalyst 7 for exhaust gas purification is disposed in the exhaust passage 8, and an A/F sensor 18 and an $O_2$ sensor 13 are respectively provided upstream of and downstream of the three-way catalyst 7.

The EGR pipe 9 is a passage for refluxing a part of exhaust gas having passed through the three-way catalyst 7 as EGR gas to the intake passage 5 and allows communication between a side of the exhaust passage 8 downstream of the three-way catalyst 7 and a side of the intake passage 5 downstream of the throttle chamber 4. An EGR cooler 11 for cooling the EGR gas flowing inside and an EGR valve 10 for regulating a flow rate of the EGR gas are provided in the EGR pipe 9. It should be noted that the EGR cooler 11 is not essential.

Detection values of the A/F sensor 18 and the $O_2$ sensor 13 are input to an engine control unit (ECU) 20. Besides these, a detection value of a crank angle sensor 14 for detecting a rotation speed Ne of the internal combustion engine 1, detection values of an accelerator pedal opening sensor 17, a water temperature sensor 19 and the like are read into the ECU 20. The ECU 20 executes various controls such as an opening control of the throttle chamber 4, an injection amount and injection timing control of fuel injection valves 15, an ignition timing control of ignition plugs 16 as an ignition timing control means/unit and an opening control of the EGR valve 10, based on these detection values. The fuel injection valves 15 are disposed in branches 6 of the intake manifold 2 connected to cylinders of the internal combustion engine 1. Fuel in a fuel tank 30 is supplied to the fuel injection valves 15 via a fuel supply pipe 31 by a fuel pump 32.

The ECU 20 is configured by a microcomputer including a central processing unit (CPU), a read only memory (ROM), a random access memory (RAM) and an input/output interface (I/O interface). It is also possible to configure the ECU 20 by a plurality of microcomputers.

It should be noted that although the internal combustion engine 1 provided with no supercharger is described here, the present invention can be similarly applied to an internal combustion engine provided with a turbo supercharger or another supercharger. Further, the internal combustion engine 1 of FIG. 1 is of a so-called port injection type in which the fuel injection valves 15 are mounted in the intake manifold 2, it may be of a direct injection type in which fuel is directly injected into cylinders.

Figure 2:
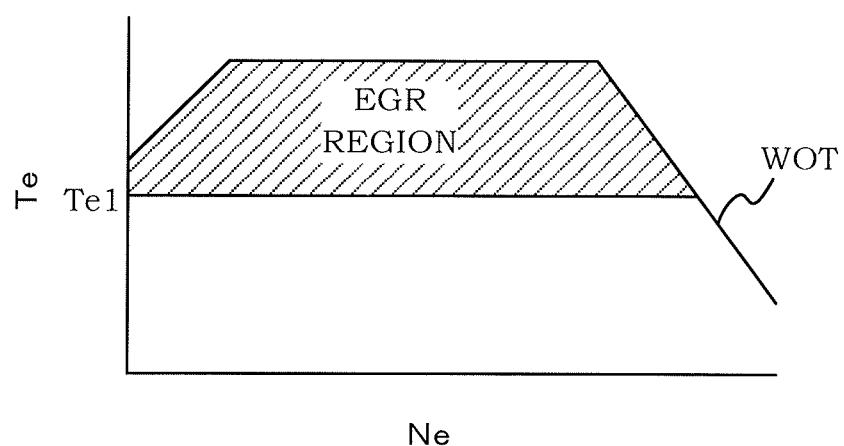
FIG. 2 is a map showing an operation region where EGR is executed.

FIG. 2 is a map showing an operation region where EGR is executed. A vertical axis of FIG. 2 represents a torque of the internal combustion engine 1, a horizontal axis represents the rotation speed Ne of the internal combustion engine 1, and a full load line is shown by a solid line WOT. The EGR is executed in a hatched region in FIG. 2, i.e. a region where the torque is not lower than Te1.

Since a combustion temperature decreases when the EGR is executed, a temperature increase in a combustion chamber can be suppressed. Accordingly, the occurrence of knocking can be prevented by executing the EGR in a region where the torque of the internal combustion engine 1 is relatively high as described above.

NOx contained in exhaust gas discharged from the internal combustion engine 1 has a property of making knocking likely to occur. Thus, if a NOx concentration in the exhaust gas is high, knocking is rather likely to occur by increasing an EGR ratio. Accordingly, knocking during the execution of the EGR is prevented by retarding an ignition timing according to the NOx concentration in the EGR gas as described later.

Figure 3:
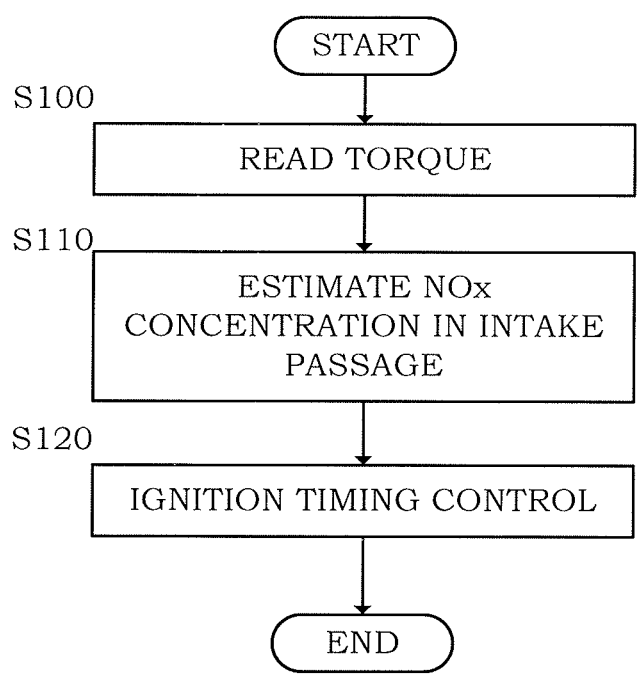
FIG. 3 is a flow chart for an ignition timing control executed by an ECU during the execution of the EGR.

FIG. 3 is a flow chart showing an ignition timing control routine executed by the ECU 20 during the execution of the EGR. It should be noted that a control is executed to set an optimal ignition timing (MBT) as in a known ignition timing control when the EGR is not executed.

In Step S100, the ECU 20 reads the torque of the internal combustion engine 1. A required torque obtained based on an accelerator pedal opening and the engine rotation speed Ne or a generated torque estimated based on an intake air amount may be used as the torque.

In Step S110, the ECU 20 estimates a NOx concentration in the intake passage as a NOx concentration estimation means/unit. The NOx concentration in the intake passage is estimated, for example, based on a state of a λ-control of an air-fuel ratio and the amount of NOx purified in the three-way catalyst 7. Since the air-fuel ratio is enriched or leaned from a stoichiometric level according to the detection value of the A/F sensor 18 in the λ-control, the amount of NOx discharged from the internal combustion engine 1 can be estimated to be less than in a stoichiometric state if the air-fuel ratio is enriched, and to be more than in the stoichiometric state if the air-fuel ratio is leaned. Although NOx discharged from the internal combustion engine 1 is removed by the three-way catalyst 7, the amount of NOx removed by the three-way catalyst 7 can be obtained by an experiment or the like in advance.

Accordingly, the NOx concentration in the intake passage is estimated by obtaining the NOx concentration in the exhaust gas discharged from the internal combustion engine 1 at the time of stoichiometry and removing the amount of NOx purified by the three-way catalyst 7 after the obtained NOx concentration is corrected based on a rich degree or a lean degree detected by the A/F sensor 18. Further, the NOx concentration may be corrected based on the ignition timing such that the earlier the ignition timing, the higher the NOx concentration. Of course, it is also possible to use a sensor for directly detecting the NOx concentration.

It should be noted that mere rich and lean states mean states richer than the stoichiometric state and leaner than the stoichiometric state.

In Step S120, the ECU 20 executes the ignition timing control according to the NOx concentration in the intake passage. Here, a relationship between the NOx concentration in the intake passage and the ignition timing is described.

Figure 4:
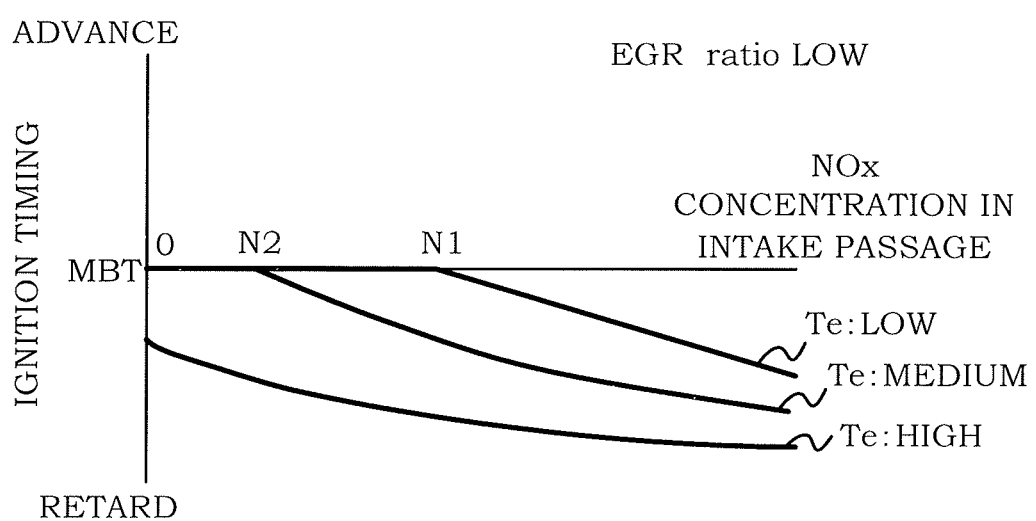
FIG. 4 is a graph showing an example of a relationship between NOx concentration in an intake passage and ignition timing for preventing knocking.

FIG. 4 is a graph showing an example of the relationship between the NOx concentration in the intake passage and the ignition timing for preventing knocking. A vertical axis represents the ignition timing and a horizontal axis represents the NOx concentration in the intake passage. It should be noted that the ignition timing on the vertical axis indicates a degree of deviation from MBT.

At a low torque, knocking does not occur up to a NOx concentration N1 even with MBT kept constant. However, at or above the NOx concentration N1, a retard amount of the ignition timing needs to be increased to prevent knocking with an increase in the NOx concentration. At a medium torque, the NOx concentration at which knocking does not occur with MBT kept constant is reduced from N1 to N2 and, at or above the NOx concentration N2, the retard amount of the ignition timing needs to be increased to prevent knocking with an increase in the NOx concentration as at the low torque. At a high torque, the ignition timing is retarded from MBT even in a state where the NOx concentration is zero and, from that state, the retard amount of the ignition timing needs to be increased with an increase in the NOx concentration since this is, in the first place, a state where knocking is likely to occur.

An increasing rate of the ignition timing retard amount relative to a change amount of the NOx concentration, i.e. a gradient of a solid line in FIG. 4 increases with a reduction in the torque. This is for the following reason. Since knocking becomes less likely to occur in the combustion chamber with a reduction in the torque, the influence of the NOx concentration increase is relatively large. Since knocking becomes more likely to occur in the combustion chamber with an increase in the torque, the influence of the NOx concentration increase is relatively small.

The ECU 20 determines the ignition timing from the NOx concentration in the intake passage estimated in Step S110 based on the aforementioned relationship between the NOx concentration in the intake passage and the ignition timing.

The NOx concentration in the intake passage can be estimated by the A/F sensor 18 as described above on the premise that purification performance of the three-way catalyst 7 is not reduced. However, in the case of a reduction in the purification performance of the three-way catalyst 7 due to age-related degradation of the catalyst, an in-catalyst atmosphere and the like, the amount of NOx purified by the three-way catalyst 7 decreases and the NOx concentration in the exhaust gas after passage through the three-way catalyst 7 is drastically increased, wherefore it is difficult to grasp an accurate NOx concentration in the intake passage.

Accordingly, the ECU 20 determines whether or not the purification performance of the three-way catalyst 7 has been reduced in parallel with the aforementioned ignition timing control of FIG. 3, and sets an ignition timing, which is different from that when the purification performance has not been reduced, in Step S120 of FIG. 3 if the purification performance has been reduced.

Figure 5:
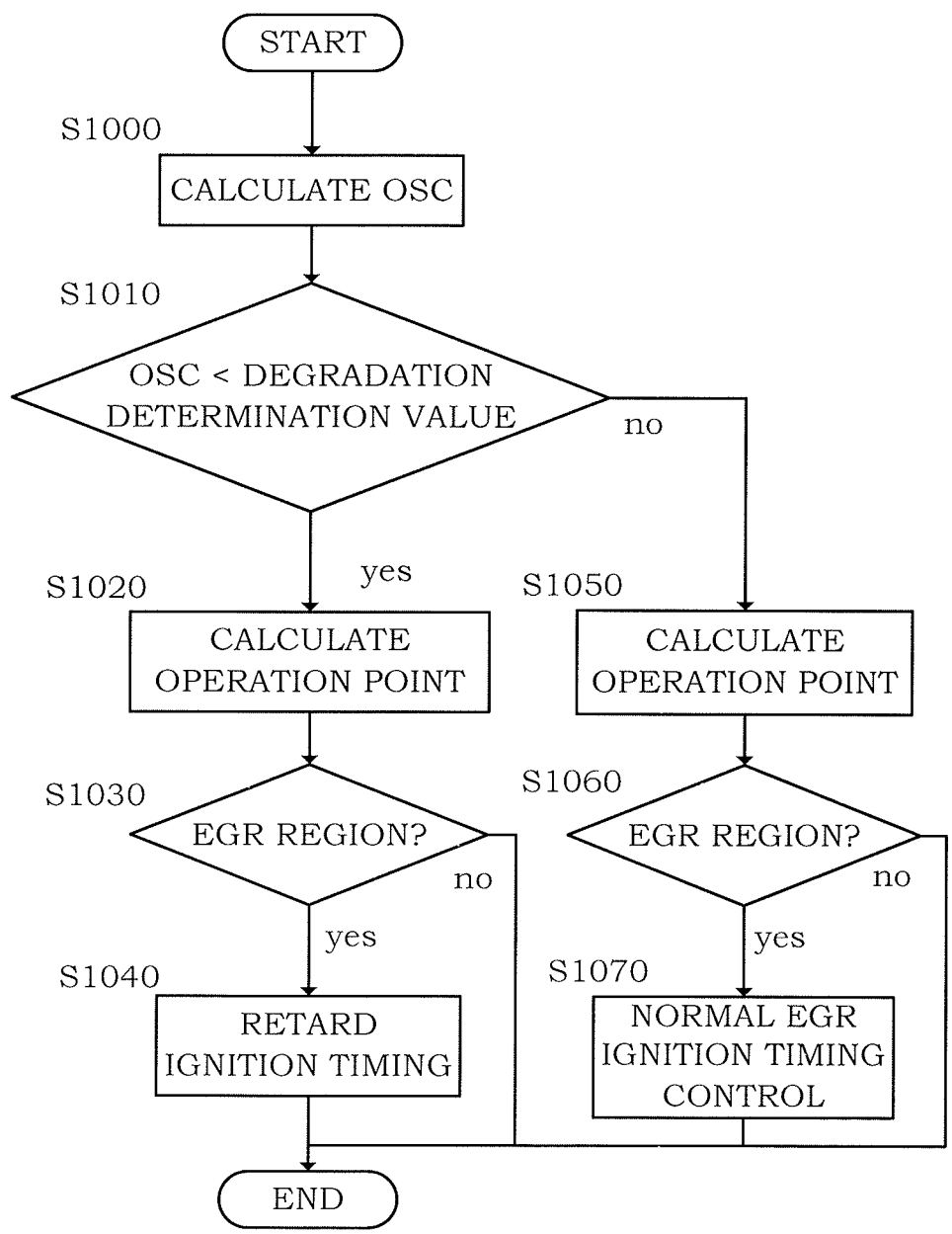
FIG. 5 is a flow chart for setting an ignition timing retard amount corresponding to purification performance of a catalyst in the first embodiment.

FIG. 5 is a flow chart of a control routine executed by the ECU 20 in parallel with the ignition timing control of FIG. 3. This control routine is for determining, as a purification performance reduction determination means/unit, whether or not the purification performance of the three-way catalyst 7 has been reduced, and retarding the ignition timing calculated in Step S120 of FIG. 3 if the purification performance has been reduced. This routine is described in accordance with Steps.

In Step S1000, the ECU 20 calculates, as an oxygen storage capability detection means, an oxygen adsorption capability of the three-way catalyst 7 (hereinafter, referred to as a "catalyst OSC capability"). Specifically, the catalyst OSC capability is calculated based on the air-fuel ratio of the exhaust gas flowing into the three-way catalyst 7 and the intake air amount, i.e. the detection values of the A/F sensor 18 and the air flow meter 3.

In Step S1010, the ECU 20 determines whether or not the catalyst OSC capability is lower than a degradation determination value set in advance, and performs a processing of Step S1020 if this capability has been degraded while performing a processing of Step S1050 if this capability has not been degraded.

The degradation detection value indicates, for example, a catalyst OSC capability in a state where guaranteed duration and distance of the purification performance required by emission control have elapsed. In this case, the degradation detection value is set for each combination of a vehicle type, the internal combustion engine 1 and an unillustrated transmission to which this system is applied.

The degradation of the catalyst OSC capability may be determined based on whether or not guaranteed duration and distance have elapsed, but degradation due to a reason other than age-related degradation cannot be determined by such a method. However, according to the determination method in this Step, degradation due to a reason other than age-related degradation can also be determined.

In Step S1020, the ECU 20 calculates an operation point determined by the torque of the internal combustion engine 1 and the rotation speed Ne.

In Step S1030, the ECU 20 determines whether or not the current operation point is within the EGR region shown in FIG. 2. A processing of Step S1040 is performed if the operation point is within the EGR region, whereas the routine this time is finished if the operation point is outside the EGR region.

In Step S1040, the ECU 20 estimates the NOx concentration in the intake passage based on the detection value of the A/F sensor 18 and sets the ignition timing retard amount based on that estimation value. Specifically, the ignition timing retard amount is set by estimating the NOx concentration of the exhaust gas after passage through the three-way catalyst 7 from the NOx concentration of the exhaust gas before passage through the three-way catalyst 7 estimated based on the detection value of the A/F sensor 18 and the amount of NOx purified by the three-way catalyst 7 if the catalyst OSC capability has not been reduced, whereas the ignition timing retard amount is set based on the NOx concentration of the exhaust gas before passage through the three-way catalyst 7 if the catalyst OSC capability has been reduced. This causes a higher NOx concentration in the intake passage to be calculated and a larger retard amount to be set as compared with the case where the catalyst OSC capability has not been reduced. Then, the ignition timing set in Step S120 of FIG. 3 is retarded by the retard amount set in this Step.

It should be noted that, in Step S1040, an ignition timing retarded only to be able to prevent knocking based on the NOx concentration estimated based on the detection value of the A/F sensor 18 may be set and the ignition timing set in Step S120 of FIG. 3 may be replaced by this.

On the other hand, if it is determined that the catalyst OSC capability has not been degraded in Step S1010, processings similar to those of Steps S1020, S1030 are performed in Step S1050, S1060. If within the EGR region, a processing of Step S1070 is performed.

In Step S1070, the ECU 20 determines the execution of the ignition timing control in the EGR region during a normal operation. The normal operation mentioned here means an operation in a state where the three-way catalyst 7 is not degraded. Specifically, in Step S1070, it is determined to adopt the ignition timing set in Step S120 of FIG. 3 as it is.

As just described, in the present embodiment, the ignition timing retard amount in the EGR region is set according to the NOx concentration after passage through the catalyst calculated based on the detection value of the A/F sensor 18 and the amount of NOx purified by the three-way catalyst 7 during the normal operation. On the other hand, if the catalyst OSC capability of the three-way catalyst 7, i.e. the purification performance has been degraded due to age-related degradation, the ignition timing retard amount is set according to the NOx concentration before passage through the catalyst calculated based on the detection value of the A/F sensor 18. Specifically, if the purification performance of the three-way catalyst 7 is determined to have been reduced, the ignition timing retard amount is set, assuming that NOx purification by the three-way catalyst 7 is not performed at all. In this way, the occurrence of knocking can be reliably avoided even in a situation where it is difficult to grasp an accurate NOx concentration due to a reduction in the purification performance of the three-way catalyst 7.

Second Embodiment

A second embodiment is similar to the first embodiment in the basic configuration of the system and the control routine shown in FIG. 3, but differs in that a means for detecting a sulfur concentration in fuel is provided and a reduction in the purification performance as an object is caused by sulfur poisoning.

Figure 6:
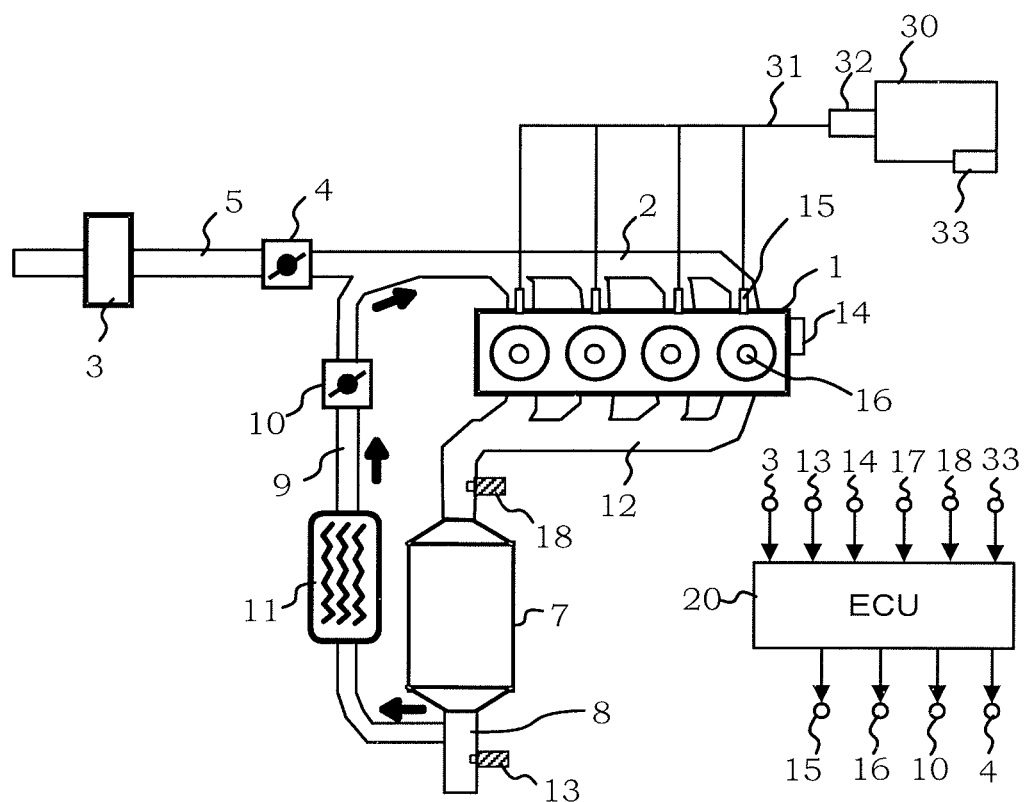
FIG. 6 is a configuration diagram of a system to which a second embodiment of the present invention is applied.

FIG. 6 is a system configuration diagram of the present embodiment. A sulfur concentration sensor 33 as the means for detecting a sulfur concentration in fuel is disposed in a fuel tank 30.

Figure 7:
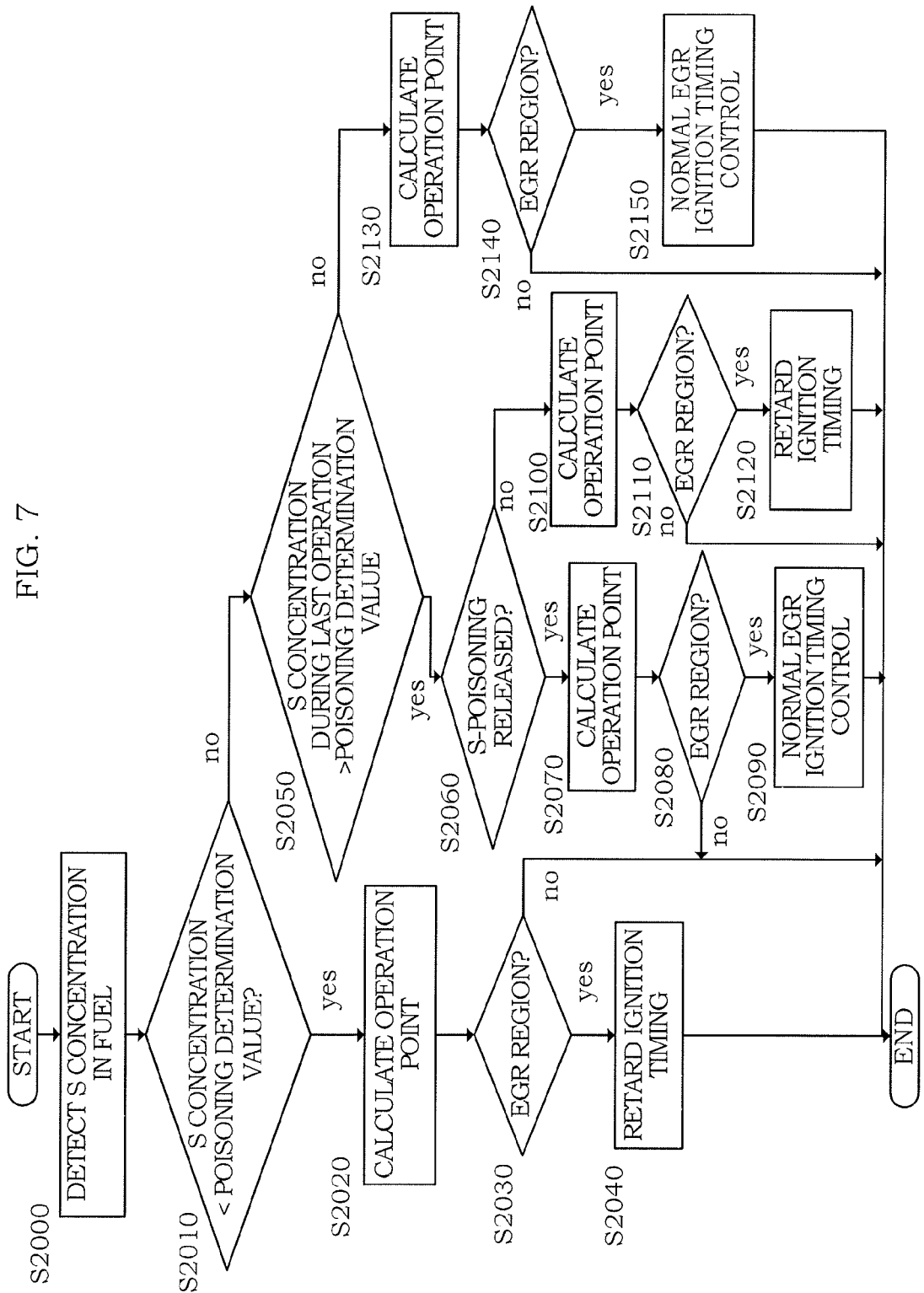
FIG. 7 is a flow chart for setting an ignition timing retard amount corresponding to purification performance of a catalyst in the second embodiment.

FIG. 7 is a flow chart of a control routine executed by an ECU 20 in parallel with the ignition timing control of FIG. 3. In this control routine, the ECU 20 determines as a sulfur poisoning determination means/unit whether or not purification performance of a three-way catalyst 7 has been reduced due to sulfur poisoning, and retards the ignition timing calculated in Step S120 of FIG. 3 if the purification performance has been reduced. This control routine is described in accordance with Steps below.

In Step S2000, the ECU 20 detects the sulfur concentration in the fuel using the sulfur concentration sensor 33. If sulfur is contained at a relatively high concentration in the fuel, sulfur components in exhaust gas are accumulated in the three-way catalyst 7 to hinder oxygen adsorption and emission functions of the three-way catalyst 7, thereby leading to a reduction in oxygen OSC capability called sulfur poisoning. Accordingly, the sulfur concentration in the fuel is first detected. It should be noted that the detected sulfur concentration is stored until the next operation.

In Step S2010, the ECU 20 determines whether or not the sulfur concentration is higher than a poisoning determination value. A concentration at which sulfur poisoning surely occurs if an operation is performed using that fuel is set in advance as the poisoning determination value.

The ECU 20 performs a processing of Step S2020 if the sulfur concentration is higher than the poisoning determination value while performing a processing of Step S2050 if the sulfur concentration is not higher than the poisoning determination value.

Processings of Steps S2020 to S2040 are not described since being similar to those of Steps S1020 to S1040 of FIG. 5.

In Step S2050, the ECU 20 determines whether or not the sulfur concentration in the fuel during the last operation is higher than the poisoning determination value. The ECU 20 performs a processing of Step S2060 if the sulfur concentration is higher than the poisoning determination value while performing a processing of Step S2130 if the sulfur concentration is not higher than the poisoning determination value.

In Step S2060, the ECU 20 determines whether or not a sulfur poisoning release condition holds. The sulfur poisoning release condition holds, for example, when a catalyst temperature has reached a predetermined value or higher during the current operation, there has been an operation period during which an air-fuel ratio is in a rich state where detoxification is possible or the current operation time has elapsed enough for detoxification. It should be noted that the current operation time serves as the poisoning release condition because poisoning is gradually released if the operation is performed using the fuel having a lower sulfur concentration than the poisoning determination value this time even if sulfur poisoning occurred during the last operation.

A processing of Step S2070 is performed if the sulfur poisoning release condition holds, whereas a processing of Step S2100 is performed unless this condition holds.

Processings of Steps S2070 to S2090 are not described since being similar to those of Step S1050 to S1070 of FIG. 5.

Processings of Steps S2100 to S2120 are not described since being similar to those of Steps S2020 to S2040, i.e. Steps S1020 to S1040 of FIG. 5.

Further, processings of Steps S2130 to S2150 are not described since being similar to those of Steps S2070 to S2090, i.e. Steps S1050 to S1070 of FIG. 5.

This control routine described above is summarized as follows.

If the sulfur concentration in the fuel during the current operation is higher than the poisoning determination value, a larger ignition timing retard amount than that during a normal operation is set based on the NOx concentration in the exhaust gas before passage through the catalyst, assuming that the three-way catalyst 7 is eventually poisoned to reduce the purification performance (Steps S2010 to S2040). The normal operation mentioned here means an operation in a state where the three-way catalyst 7 is not degraded as in the first embodiment.

If the sulfur concentration in the fuel during the current operation is lower than the poisoning determination value, whether or not the sulfur concentration in the fuel used during the last operation is higher than the poisoning determination value is determined. If the sulfur concentration is lower than the poisoning determination value also during the last operation, an ignition timing similar to that during the normal operation is set (Steps S2010, S2050, S2130 to S2150). This is because the three-way catalyst 7 can be estimated to be not poisoned if the sulfur concentration in the fuel is lower than the poisoning determination value both during the last operation and during the current operation and, hence, knocking does not occur even at the ignition timing similar to that during the normal operation.

If the sulfur concentration in the fuel during the last operation is higher than the poisoning determination value even though the sulfur concentration in the fuel during the current operation is lower than the poisoning determination value, the ignition timing control is changed depending on whether or not the sulfur poisoning release condition holds. If the poisoning release condition holds, the ignition timing similar to that during the normal operation is set (Steps S2010, S2050 to S2090). This is because sulfur poisoning is currently released even despite the sulfur poisoning during the last operation and knocking does not occur even at the ignition timing similar to that during the normal operation. On the other hand, unless the poisoning release condition holds, a larger ignition timing retard amount than that during the normal operation is set based on the NOx concentration in the exhaust gas before passage through the catalyst (Steps S2010, S2050, S2100 to S2120) since the three-way catalyst 7 remains poisoned from the last operation and knocking is likely to occur.

As just described, in the present embodiment, the ignition timing retard amount in the ECG region is set according to the NOx concentration after passage through the catalyst calculated based on the detection value of the A/F sensor 18 and the amount of NOx purified by the three-way catalyst 7 during the normal operation. On the other hand, if the catalyst OSC capability of the three-way catalyst 7, i.e. purification performance has been degraded due to sulfur poisoning, the ignition timing retard amount is set according to the NOx concentration before passage through the catalyst calculated based on the detection value of the A/F sensor 18. Specifically, if the purification performance of the three-way catalyst 7 is determined to have been reduced due to sulfur poisoning, the ignition timing retard amount is set, assuming that NOx purification by the three-way catalyst 7 is not performed at all. In this way, the occurrence of knocking can be reliably avoided even in a situation where it is difficult to grasp an accurate NOx concentration due to a reduction in the purification performance of the three-way catalyst 7. Further, since the presence or absence of sulfur poisoning can be reliably determined, an output reduction and fuel economy deterioration are not caused by significantly retarding the ignition timing in a state where there is no possibility of the occurrence of knocking.

It should be noted that although the presence or absence of sulfur poisoning is determined based on the sulfur concentration, a poisoned state of the three-way catalyst 7 may be estimated or directly detected.

Third Embodiment

A third embodiment is similar to the first embodiment in the basic configuration of the system and the control routine shown in FIG. 3, but differs in that a reduction in the purification performance as an object is caused by excessive oxygen in the catalyst. A reduction in the purification performance caused by excessive oxygen means that a state where fresh air passes through the internal combustion engine 1 as it is and flows into the three-way catalyst 7 continues, for example, as during a fuel cut control, an oxygen storage amount of the three-way catalyst 7 becomes excessive and NOx cannot be reduced after a fuel cut recovery.

Figure 8:
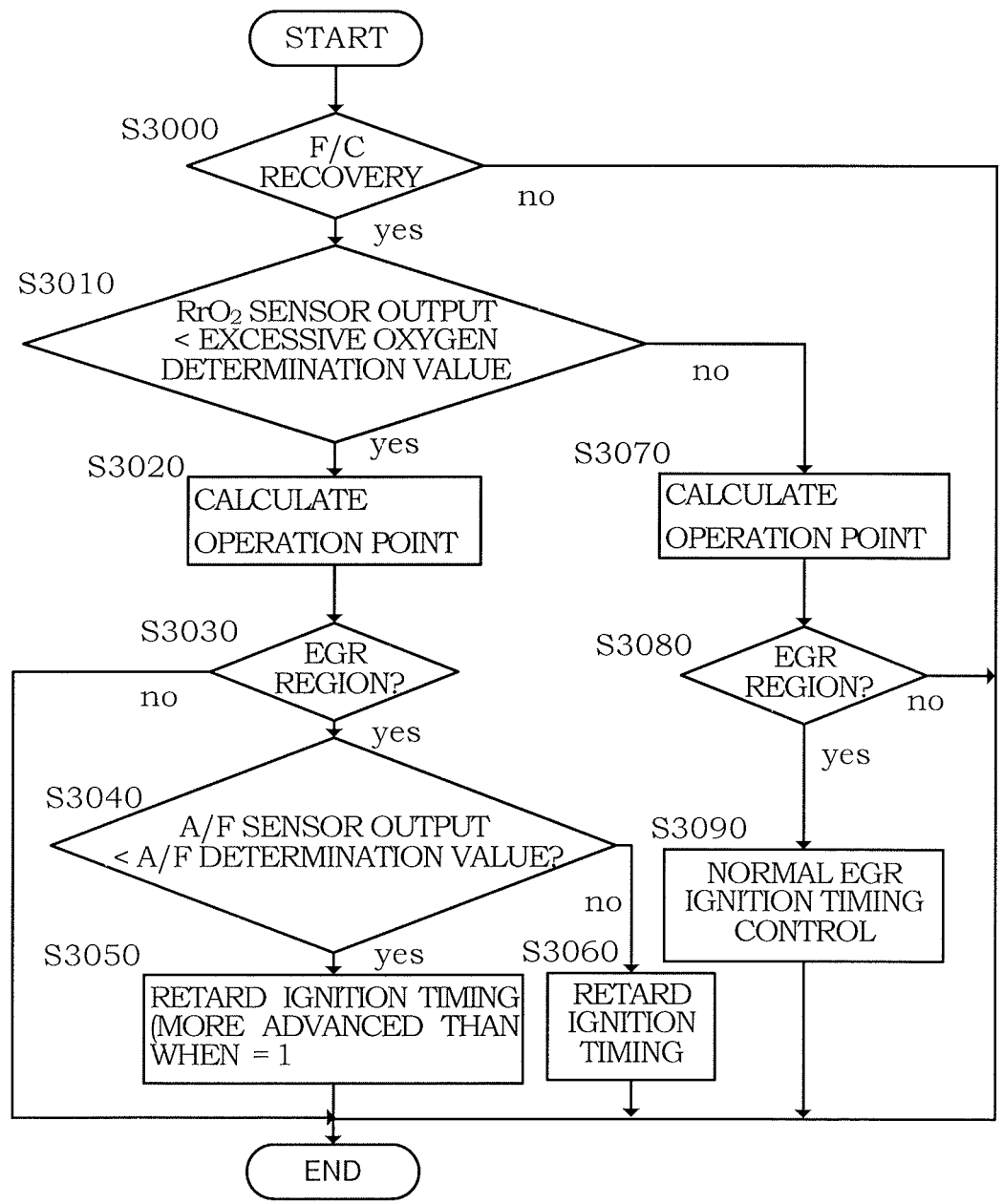

FIG. 8 is a flow chart of a control routine executed by an ECU 20 in parallel with the ignition timing control of FIG. 3. In this control routine, the ECU 20 determines as an in-catalyst atmosphere detection means/unit whether or not purification performance of a three-way catalyst 7 has been reduced due to excessive oxygen and retards the ignition timing calculated in Step S120 of FIG. 3 if the purification performance has been reduced. This control routine is described in accordance with Steps below.

In Step S3000, the ECU 20 determines whether or not a fuel cut recovery is in process, i.e. a return has been made from a fuel cut control during deceleration. A processing of Step S3010 is performed if the return has been made, whereas the routine this time is finished if the return has not been made.

In Step S3010, the ECU 20 determines whether or not an output of an $O_2$ sensor 13 is smaller than an excessive oxygen determination value. The excessive oxygen determination value is, for example, a sensor output (about 600 mV) when $\lambda=1$ in the three-way catalyst 7. It should be noted that an excessive oxygen determination region having a width of about 50 mV may be set on each of a rich side and a lean side, considering the case of a change from the rich side to the lean side or a change from the lean side to the rich side.

As a result of the determination, a processing of Step S3020 is performed if the output of the $O_2$ sensor 13 is smaller than the excessive oxygen determination value, whereas the processing of Step S3070 is performed if it is not smaller than the excessive oxygen determination value.

In Steps S3020, S3030, the ECU 20 performs processings similar to those of Steps S1020, S1030 of FIG. 5.

As a result of the determination in Step S3030, a processing of Step S3040 is performed if within the EGR region, whereas the routine this time is finished unless within the EGR region.

In Step S3040, the ECU 20 determines whether or not an output of an A/F sensor 18 is smaller than an A/F determination value. The A/F determination value is an output when $\lambda=1$ at which the three-way catalyst 7 can fulfill a purifying function. That is, whether or not an air-fuel ratio detected by the A/F sensor 18 is rich is determined in this Step. This determination is for detecting whether or not a rich spike for setting a stoichiometric state in the three-way catalyst 7 having entered an excessive oxygen state during a fuel cut as described later is being executed by the ECU 20 as a rick spike execution means/units.

As a result of the determination, a processing of Step S3050 is performed if the air-fuel ratio is rich, whereas a processing of Step S3060 is performed if the air-fuel ratio is stoichiometric or lean.

In both Steps S3050 and S3060, the ECU 20 sets a larger ignition timing retard amount than that during a normal operation. Specifically, if the interior of the three-way catalyst 7 is in the excessive oxygen state, a larger ignition timing retard amount than that during the normal operation is set based on a NOx concentration at the entrance of the catalyst, assuming that the purification performance has been reduced. However, the ignition timing retard amount set in Step S3050 is smaller than that set in Step S3060.

Such setting of the ignition timing retard amount is described. That the air-fuel ratio is rich at a catalyst entrance side means a lower NOx concentration as compared with the case where the air-fuel ratio is stoichiometric or lean. Accordingly, the NOx concentration on a catalyst exit side is lower in the state of Step S3050 where the air-fuel ratio is rich at the catalyst entrance side and lean at the catalyst exit side than in the state of Step S3060 where the air-fuel ratio is lean both at the catalyst entrance and exit sides. Specifically, in the state of Step S3050, the NOx concentration in the intake passage is lower than in the state of Step S3060 and knocking is unlikely to occur. Thus, the ignition timing is set on a more advanced side in the state where knocking is unlikely to occur than in the state where knocking is likely to occur.

On the other hand, if the output of the $O_2$ sensor 13 is not smaller than the excessive oxygen determination value, the ECU 20 performs processings similar to those of Step S1020, S1030 of FIG. 5 in Steps S3070, S3080. As a result of the determination in Step S3080, a processing of Step S3090 is performed if within the EGR region, whereas the routine this time is finished unless within the EGR, region.

Figure 9:
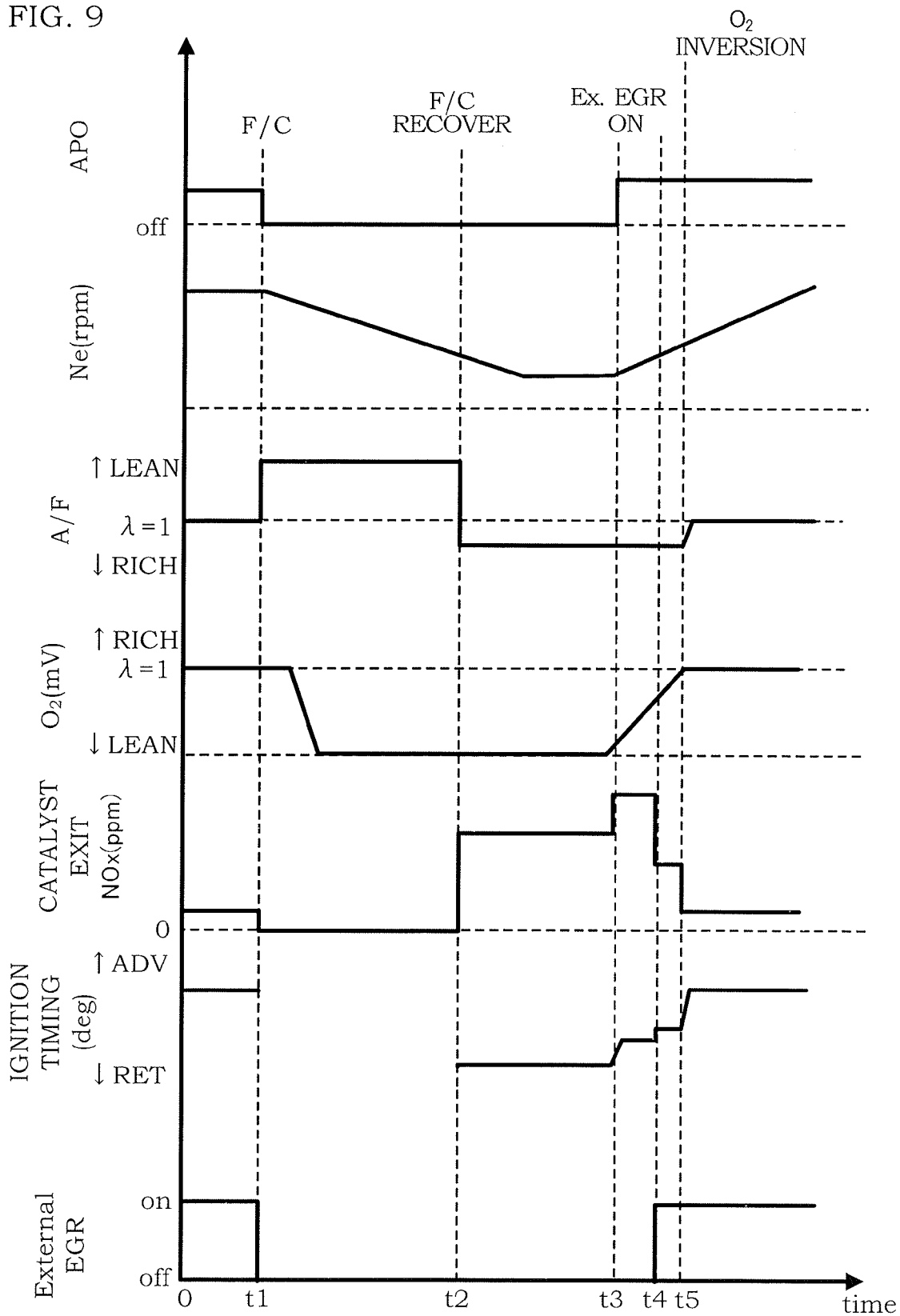
FIG. 9 is a time chart when a control routine of FIG. 8 is executed.

FIG. 9 is a tune chart when this control routine is executed.

Since intake air is discharged as it is from the internal combustion engine 1 when an accelerator pedal is fully closed and a fuel cut control is started at timing t1, the air-fuel ratio at the catalyst entrance detected by the A/F sensor 18 becomes lean. Associated with this, the air-fuel ratio at the catalyst exit detected by the $O_2$ sensor 13 also becomes lean. Further, since the EGR is stopped during the fuel cut control, the NOx concentration at the catalyst exit decreases.

This state continues while the fuel cut is performed, whereby the interior of the three-way catalyst 7 is set in the excessive oxygen state.

When a fuel cut recovery is made at timing t2, the air-fuel ratio at the catalyst entrance becomes rich. This is because the ECU 20 as the rick spike execution means/unit executes a rich spike to quickly return the three-way catalyst 7 from the excessive oxygen state to the stoichiometric state. Since oxygen adsorbed in the three-way catalyst 7 is released also during the rich spike, the air-fuel ratio at the catalyst exit remains lean. Further, since excessive oxygen in the three-way catalyst 7 is not resolved, the NOx concentration at the catalyst exit increases. The ignition timing is retarded as compared with that before the fuel cut.

When the accelerator pedal, is pressed at timing t3, the NOx concentration at the catalyst exit further increases with an increase in the engine rotation speed Ne and the ignition timing is advanced. Further, the excessive oxygen state in the three-way catalyst 7 is gradually resolved and the air-fuel ratio at the catalyst exit gradually changes to become richer.

When the EGR is started at timing t4, the NOx concentration at the catalyst exit decreases due to an EGR execution effect. At this time, the processing of Step S3050 of FIG. 7 is performed since the air-fuel ratio at the catalyst entrance is rich and that at the catalyst exit is lean. That is, the ignition timing is set at a timing retarded from that during the normal operation, but advanced from that during the operation in the stoichiometric state in the excessive oxygen state.

When the air-fuel ratio at the catalyst exit reaches stoichiometry at timing t5, the rich spike is finished and a return is made to the normal operation, assuming that the excessive oxygen state of the three-way catalyst 7 has been resolved.

As just described, in the present embodiment, the ignition timing is set based on the NOx concentration at the catalyst entrance, assuming that the purification performance has been reduced, if the interior of the three-way catalyst 7 is in the excessive oxygen state. Since this causes the ignition timing retarded from that during the normal operation to be set, the occurrence of knocking can be prevented.

Further, if the rich spike is executed to resolve the excessive oxygen state when the ignition timing is set based on the NOx concentration at the catalyst entrance, a more advanced ignition timing, in other words, a smaller ignition timing retard amount is set as compared with an operation at the stoichiometric air-fuel ratio in the excessive oxygen state. This prevents an output reduction and fuel economy deterioration caused by retarding the ignition timing more than necessary.

Although the embodiments of the present invention have been described above, the above embodiments are only an illustration of some application examples of the present invention and not intended to limit the technical scope of the present invention to the specific configurations of the above embodiments.

This application claims a priority of Japanese Patent Application No. 2011-232678 filed with the Japan Patent. Office on Oct. 24, 2011, all the contents of which are hereby incorporated by reference.

The invention claimed is:

1. A spark ignition internal combustion engine, comprising:
   an exhaust gas reflux device configured to reflux exhaust gas having passed through a catalyst for exhaust gas purification to an intake passage;
   an ignition timing control unit configured to set an ignition timing retard amount to prevent knocking according to a NOx concentration in the intake passage while the exhaust gas is refluxed;
   a NOx concentration estimation unit configured to estimate a NOx concentration in the exhaust gas; and
   a purification performance reduction determination unit configured to determine a reduction in purification performance of the catalyst;
   wherein the ignition timing control unit sets the ignition timing retard amount based on the NOx concentration in the exhaust gas before passage through the catalyst if the purification performance reduction determination unit determines that the purification performance of the catalyst has been reduced to a state set in advance.

2. The spark ignition internal combustion engine according to claim 1, wherein:
   the ignition timing control unit sets the ignition timing retard amount based on the NOx concentration in the exhaust gas after passage through the catalyst if the purification performance of the catalyst has not been reduced.

3. The spark ignition internal combustion engine according to claim 1, further comprising:
   an oxygen storage capability detection unit configured to detect an oxygen storage capability of the catalyst;
   wherein the purification performance reduction determination unit determines that the purification performance has been reduced if the oxygen storage capability has been reduced to a state set in advance.

4. The spark ignition internal combustion engine according to claim 1, further comprising:
   a sulfur poisoning determination unit configured to detect whether or not the catalyst is sulfur-poisoned;
   wherein the purification performance reduction determination unit determines that the purification performance has been reduced if the occurrence of sulfur poisoning is determined by the sulfur poisoning determination means.

5. The spark ignition internal combustion engine according to claim 1, further comprising:
   an in-catalyst atmosphere detection unit configured to detect an atmosphere in the catalyst;
   wherein the purification performance reduction determination unit determines that the purification performance has been reduced if the interior of the catalyst is in an excessive oxygen state.

6. The spark ignition internal combustion engine according to claim 5, further comprising:
   a rich spike execution unit configured to execute a rich spike to change a state in the catalyst from the excessive oxygen state to a stoichiometric state;
   wherein the ignition timing control unit sets a smaller ignition timing retard amount than that during an operation at a stoichiometric air-fuel ratio in the excessive oxygen state if the rich spike is in execution in the excessive oxygen state.

7. A spark ignition internal combustion engine, comprising:
   an exhaust gas reflux device configured to reflux exhaust gas having passed through a catalyst for exhaust gas purification to an intake passage;
   ignition timing control means for setting an ignition timing retard amount to prevent knocking according to a NOx concentration in the intake passage while the exhaust gas is refluxed;
   NOx concentration estimation means for estimating a NOx concentration in the exhaust gas; and
   purification performance reduction determination means for determining a reduction in purification performance of the catalyst;
   wherein the ignition timing control means sets the ignition timing retard amount based on the NOx concentration in the exhaust gas before passage through the catalyst if the purification performance reduction determination means determines that the purification performance of the catalyst has been reduced to a state set in advance.

8. A control method of a spark ignition internal combustion engine, the method comprising:
   refluxing exhaust gas having passed through a catalyst for exhaust gas purification to an intake passage;
   retarding an ignition timing amount to prevent knocking according to a NOx concentration in the intake passage while the exhaust gas is refluxed;
   estimating a NOx concentration in the exhaust gas;
   determining a reduction in purification performance of the catalyst;
   wherein the ignition timing amount is based on the NOx concentration in the exhaust gas before passage through the catalyst if the purification performance of the catalyst has been reduced to a state set in advance.

* * * * *